US011927951B2

(12) United States Patent
McKinley et al.

(10) Patent No.: US 11,927,951 B2
(45) Date of Patent: Mar. 12, 2024

(54) REMOTE WIRELESS HYDRAULIC CAB

(71) Applicants: ZOOMLION Heavy Industry NA, Inc., Yorkville, WI (US); ZOOMLION Heavy Industry Science and Technology Co. Ltd., Changsha Hunan Province (CN)

(72) Inventors: Mark McKinley, Wauwatosa, WI (US); Brittney Bembenek, Milwaukee, WI (US); Matthew Seeger, Franskville, WI (US); Steven Melotik, Kenosha, WI (US)

(73) Assignees: ZOOMLION HEAVY INDUSTRY NA, INC., Yorkville, WI (US); ZOOMLION HEAVY INDUSTRY SCIENCE AND TECHNOLOGY CO. LTD, Changsha Hunan Province (CN)

( * ) Notice: Subject to any disclaimer, the term of this patent is extended or adjusted under 35 U.S.C. 154(b) by 220 days.

(21) Appl. No.: 17/579,675

(22) Filed: Jan. 20, 2022

(65) Prior Publication Data

US 2023/0229157 A1    Jul. 20, 2023

(51) Int. Cl.
*G05D 1/00*   (2006.01)
*B62D 33/073*  (2006.01)
(Continued)

(52) U.S. Cl.
CPC ........ *G05D 1/0016* (2013.01); *B62D 33/073* (2013.01); *F15B 15/20* (2013.01);
(Continued)

(58) Field of Classification Search
CPC .. G05D 1/0016; G05D 1/0022; B62D 33/073; F15B 15/20; F15B 19/00; G07C 5/0808
See application file for complete search history.

(56) References Cited

U.S. PATENT DOCUMENTS

| 2016/0010310 A1* | 1/2016 | Schmidt | E02F 3/432 |
| | | | 701/2 |
| 2017/0237240 A1* | 8/2017 | Mull | B60R 16/023 |
| | | | 105/397 |
| 2023/0070893 A1* | 3/2023 | Nagao | E02F 9/2285 |

FOREIGN PATENT DOCUMENTS

| CN | 105765134 A | * | 7/2016 | ......... B60R 16/0231 |
| DE | 1306278 | * | 5/2003 | |
| KR | 20220098954 | * | 7/2022 | ................ E02F 9/22 |

OTHER PUBLICATIONS

KR 20220098954 A machine translation (Year: 2022).*
CN105765134A machine translation (Year: 2016).*
EP 1306278 A2 machine translation (Year: 2003).*

* cited by examiner

*Primary Examiner* — Anne Marie Antonucci
*Assistant Examiner* — Jingli Wang
(74) *Attorney, Agent, or Firm* — Donald J. Ersler

(57) ABSTRACT

A remote wireless hydraulic cab preferably includes a cab member, a hydraulic sensor block, an electrical bulkhead, a cab bridge controller and a cab transceiver. The cab member preferably includes a cab enclosure, two hydraulic joysticks, two hydraulic treadles and electrical equipment. The hydraulic sensor block includes a sensor block and a plurality of hydraulic pressure sensors. Hydraulic lines from the joysticks and treadles are connected to the sensor block. Pressure measurements from the joysticks and treadles are sent from the plurality of hydraulic pressure sensors to the cab bridge controller. The cab bridge controller sends signals for wireless transmission through a cab wireless transceiver to a frame transceiver. The electrical equipment is supplied with electrical power and transmits signals through the electrical bulkhead. Electrical power to the cab enclosure is supplied through an electrical generator and hydraulic fluid (Continued)

to the joysticks and treadles are supplied through a hydraulic pump.

17 Claims, 6 Drawing Sheets

(51) Int. Cl.
  *F15B 15/20* (2006.01)
  *F15B 19/00* (2006.01)
  *G07C 5/08* (2006.01)
(52) U.S. Cl.
  CPC ............ *F15B 19/00* (2013.01); *G05D 1/0022* (2013.01); *G07C 5/0808* (2013.01)

REMOTE WIRELESS HYDRAULIC CAB

BACKGROUND OF THE INVENTION

1. Field of the Invention

The present invention relates generally to heavy equipment and more specifically to a remote wireless hydraulic cab, which allows a modular hydraulic cab to be detached and remotely operated from a heavy equipment frame module.

2. Discussion of the Prior Art

A remote wireless hydraulic cab module is used in conjunction with a remote wireless frame module. The remote wireless hydraulic cab is located a distance from the remote wireless frame module. The remote wireless frame module includes at least one tool, such as a shovel. The hydraulic cab module communicates wirelessly with the frame module. The wireless communication may be implemented with any suitable wireless protocol. The hydraulic cab includes hydraulic operated joysticks and foot treadles, which must be supplied with hydraulic fluid to operate the at least one tool. The hydraulic cab module includes is supplied with electrical power through an electrical generator and pressurized hydraulic fluid through a hydraulic pump. The inputs from the hydraulic joysticks and foot treadles are converted into electrical signals and transmitted wirelessly to the frame module. The remote wireless frame module receives electrical signals from the hydraulic cab module and converts the wireless electrical signals for controlling a plurality of hydraulic valves. It appears that the prior art does not teach or suggest a system for remote wireless operation of at least one tool on a frame module by a hydraulic cab module.

Accordingly, there is clearly felt need in the art for a remote wireless hydraulic cab, which allows a modular hydraulic cab to be detached and remotely operated from a heavy equipment frame module.

SUMMARY OF THE INVENTION

The present invention provides a remote wireless hydraulic cab, which allows a modular hydraulic cab to be detached and remotely operated from a heavy equipment frame module. The remote wireless hydraulic cab preferably includes a cab member, an electrical bulkhead, a cab bridge controller and a cab transceiver. The cab member preferably includes a cab enclosure, a plurality of hydraulic joysticks, a plurality of hydraulic treadles, a plurality of hydraulic lines and a plurality of electrical control devices. One end the plurality of hydraulic lines are connected to the plurality of joysticks and the plurality of hydraulic treadles. Two of the plurality of hydraulic lines are a hydraulic pressure line and a hydraulic return line.

The hydraulic pressure line, the hydraulic return line and the plurality of hydraulic joysticks and hydraulic treadles are connected to a hydraulic circuit block. An opposing end of the plurality of hydraulic lines may be retained in a hydraulic sensor plate. A plurality of quick disconnect adapters extent from one side of the hydraulic sensor plate and a plurality of threaded adapters extend from an opposing side of the hydraulic sensor plate. The plurality of quick disconnect adapters are sized to receive the opposing end of the plurality of hydraulic lines. The plurality of pressure sensors are threaded into plurality of threaded adapters. Hydraulic pressure in the plurality of hydraulic lines are measured by the plurality of hydraulic pressure sensors. An electrical output from each hydraulic pressure sensor is connected to the cab bridge controller. The electrical bulkhead includes a signal socket and a power socket. A signal cable includes a bulkhead plug extending from one end and a controller plug extending from an opposing end. The bulkhead plug is plugged into the signal socket and the controller plug is plugged into the cab bridge controller for transfer of electrical signals from the cab member to the cab bridge controller. A vehicle controller is preferably used to receive electrical signals from a button panel. The vehicle controller is also used to display information to an operator display. The vehicle controller is also connected to the cab bridge controller.

An output from the cab bridge controller is connected to the cab transceiver. The cab transceiver transmits the plurality of electrical signals from the plurality of hydraulic pressure sensors and electrical signals from the vehicle controller through the signal socket. A hydraulic pump is connected to the hydraulic pressure and return lines. A power cable includes a generator plug on one end and a power plug on an opposing end. The generator plug is connected to an electrical generator and the power plug is plugged into the power socket. With the hydraulic pump and the electric generator connections, the modular hydraulic cab is capable of operating remotely from a modular hydraulic frame through wireless communication.

A docking station may be used to provide a physical foundation and an operational base for the modular hydraulic cab. The docking station includes a base member, a hydraulic pump and an electrical generator. The base member includes a support base and at least two upright mounting members. The at least two upright mounting members extend upward from the support base. A fastener threaded tap or hole is formed through a top of each upright mounting members. The hydraulic pump and the electrical generator are preferably attached to a top surface of the support base. A hydraulic modular cab is attached to the at least two upright mounting members with four fasteners. The hydraulic pump is connected to the hydraulic pressure and return lines. The electrical generator is connected to the electrical bulkhead through the power cable. The hydraulic modular cab may be operated with the docking station.

Accordingly, it is an object of the present invention to provide a remote wireless hydraulic cab, which allows a modular hydraulic cab to be detached and remotely operated from a heavy equipment frame module.

These and additional objects, advantages, features and benefits of the present invention will become apparent from the following specification.

DETAILED DESCRIPTION OF THE PREFERRED EMBODIMENTS

Figure 1:
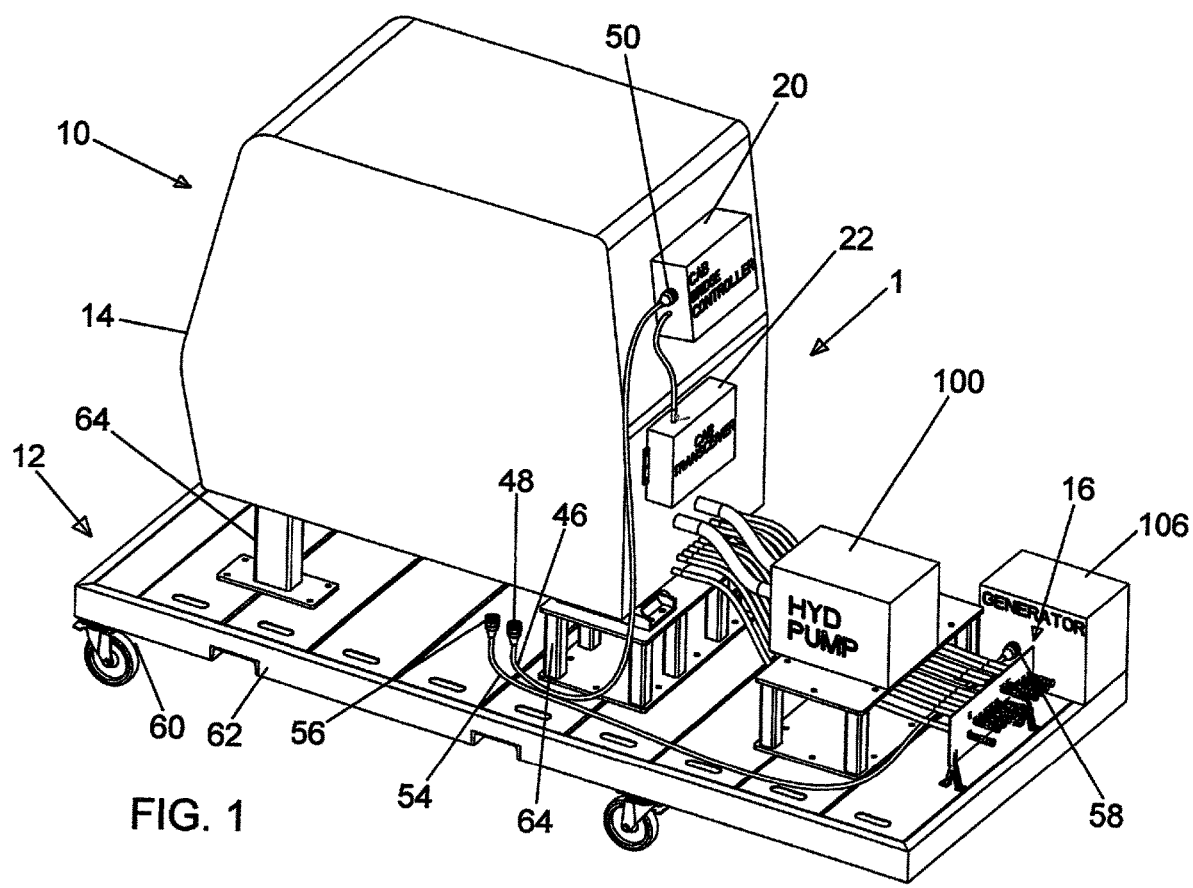
FIG. 1 is a perspective view of a remote wireless hydraulic cab module retained on a docking station in accordance with the present invention.
Figure 2:
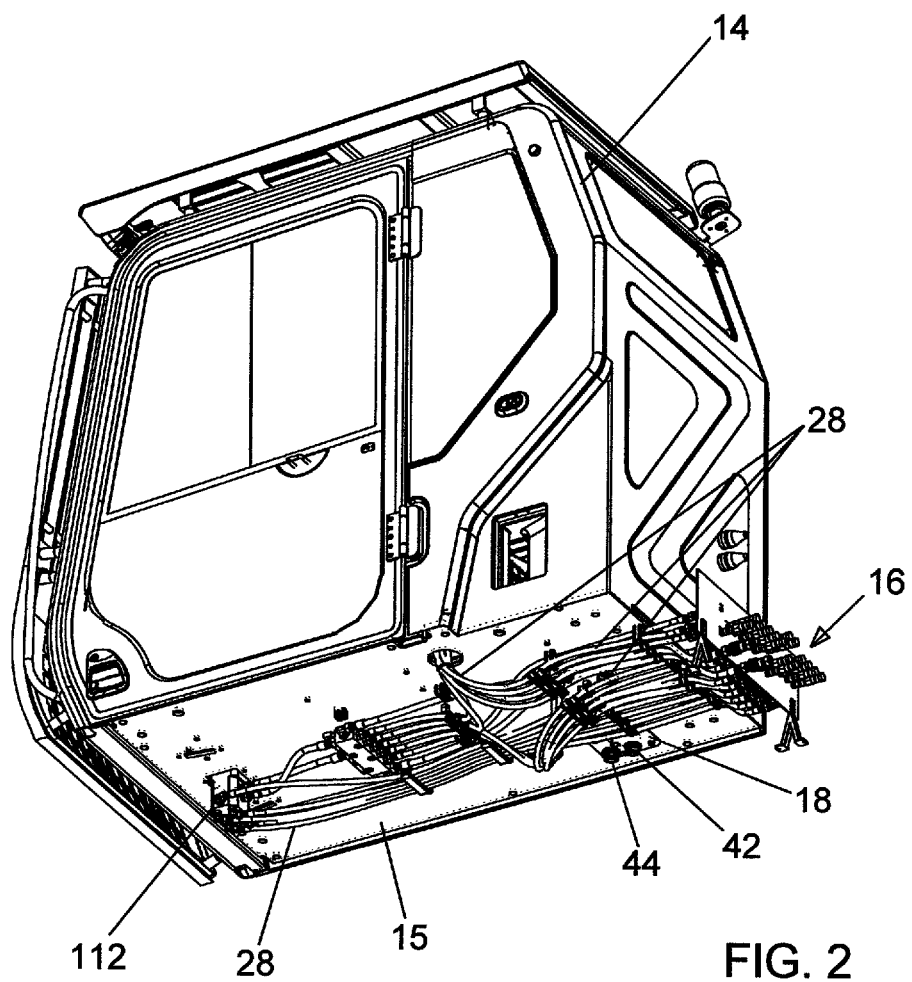
FIG. 2 is a bottom perspective view of a remote wireless hydraulic cab module illustrating a plurality of hydraulic lines from a plurality of joysticks and foot treadles connected to a hydraulic sensor plate in accordance with the present invention.
Figure 3:
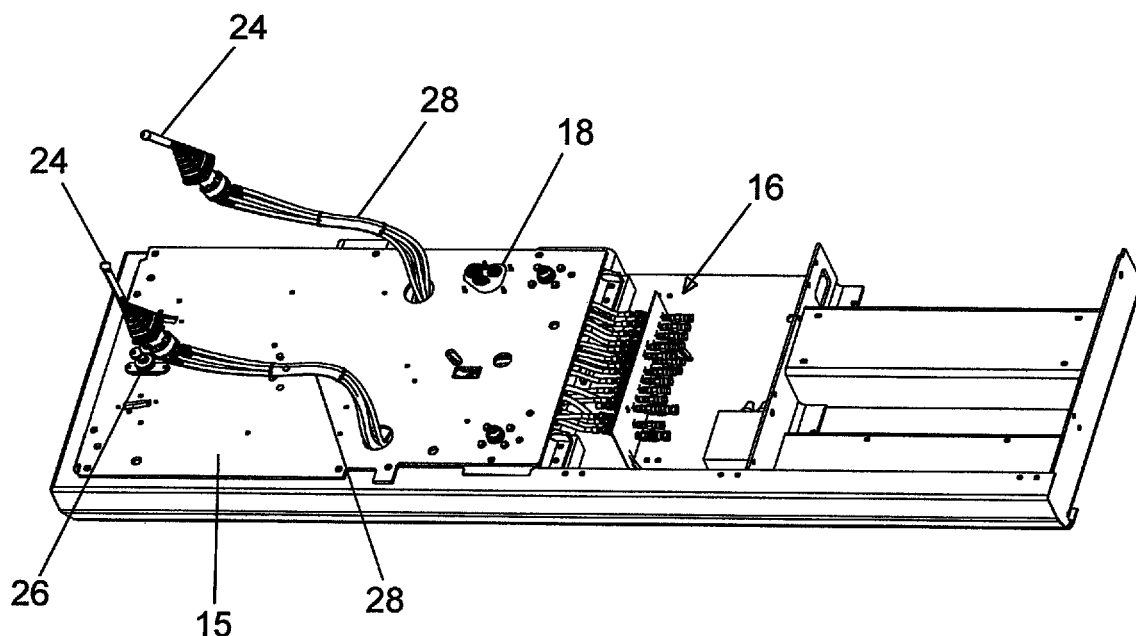
FIG. 3 is a top perspective cutaway view of a remote wireless hydraulic cab module illustrating two joysticks and two foot treadles with hydraulic lines connected to a hydraulic sensor plate in accordance with the present invention.
Figure 4:
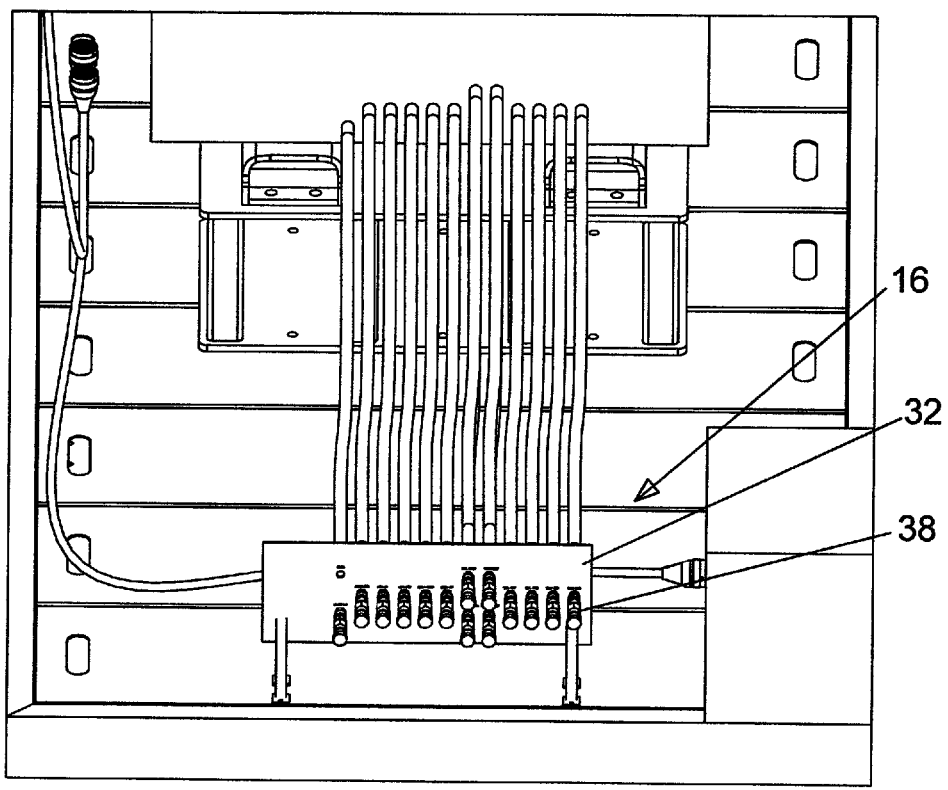
FIG. 4 is a top perspective view of a hydraulic sensor plate of a remote wireless hydraulic cab module in accordance with the present invention.
Figure 5:
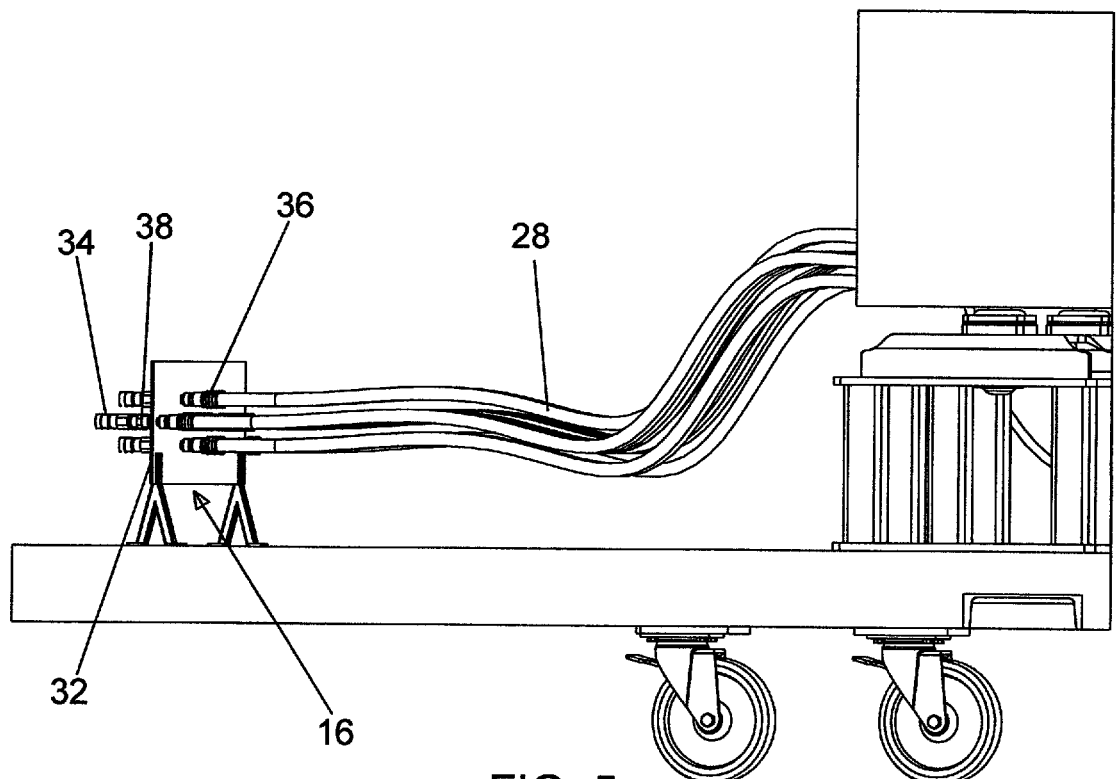
FIG. 5 is an end perspective view of a hydraulic sensor plate of a remote wireless hydraulic cab module in accordance with the present invention.
Figure 6:
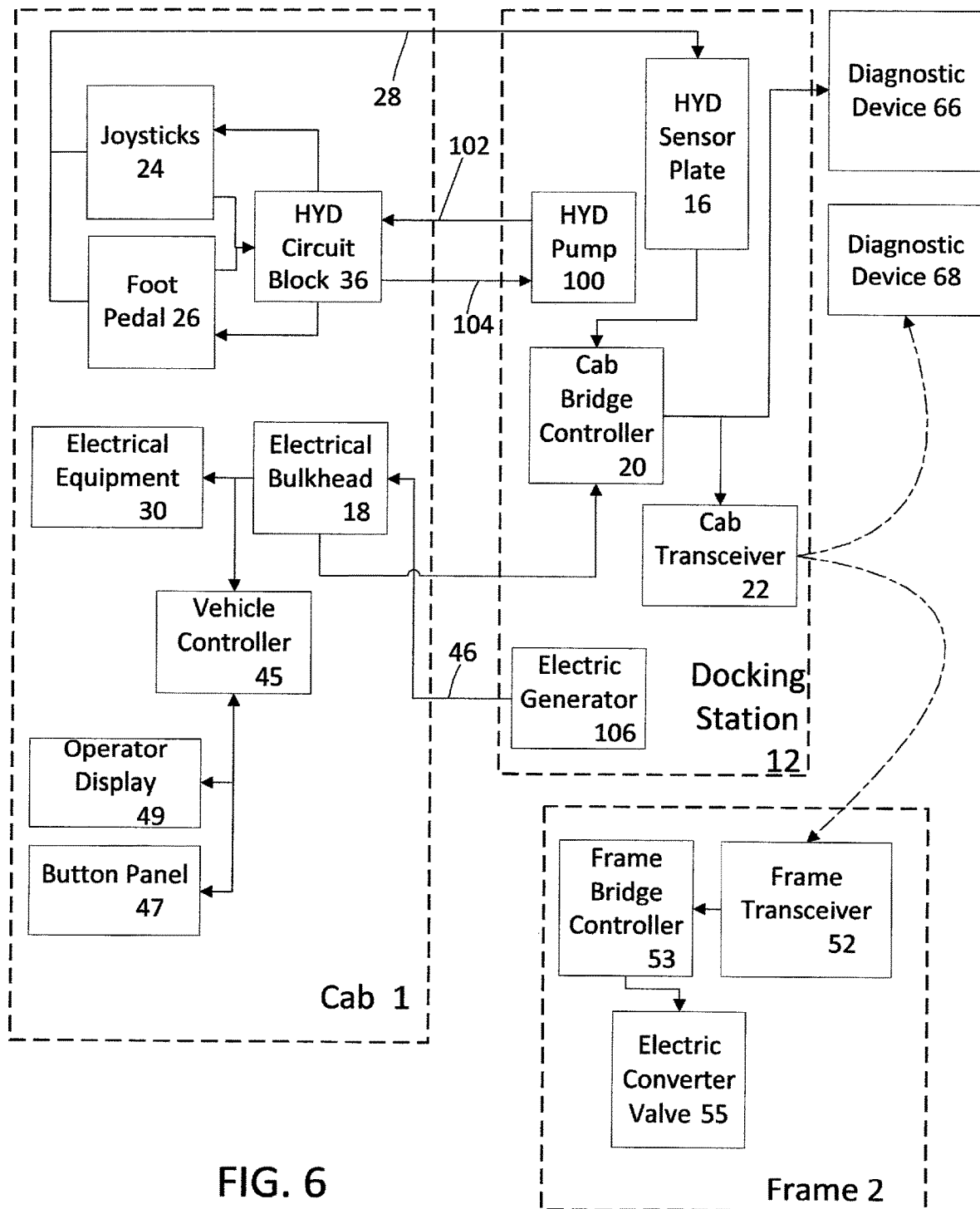
FIG. 6 is a schematic diagram of a remote wireless hydraulic cab module illustrating hydraulic and electrical systems in accordance with the present invention.

With reference now to the drawings, and particularly to FIG. 1, there is shown a perspective view of a remote wireless hydraulic cab (hydraulic cab) 1 mounted to a docking station 12. With reference to FIG. 6, the hydraulic cab 1 preferably includes a cab member 10, a hydraulic sensor plate 16, an electrical bulkhead 18, a cab bridge controller 20 and a cab transceiver 22. With reference to FIGS. 2-3, the cab member 10 preferably includes a cab enclosure 14, a plurality of hydraulic joysticks 24, a plurality of hydraulic treadles 26, a plurality of hydraulic lines 28 and electrical equipment 30. With reference to FIGS. 4-5, the hydraulic sensor plate 16 includes a plate member 32, a plurality of quick disconnect adapters 36 and a plurality of threaded adapters 38. One end of the plurality of hydraulic lines 28 are connected to the plurality of joysticks 24 and the plurality of hydraulic treadles 26.

A hydraulic pressure line 102 and a hydraulic return line 104 of a hydraulic pump 100 are connected to an input of a hydraulic circuit block 36. The hydraulic pump 100 distributes hydraulic fluid to the plurality of hydraulic joysticks 24 and hydraulic treadles 26 through the hydraulic circuit block 36. The plurality of quick disconnect adapters 36 are threadably engaged with the plate member 32 on one side thereof. The plurality of threaded adapters 38 are threadably engaged with the plurality of quick disconnect adapters 36 on an opposing side of the plate member 32. A plurality of hydraulic pressure sensors 34 are threaded into the plurality of threaded adapters 38. Hydraulic pressure in the joysticks 24 and foot treadles 26 hydraulic lines 28 are measured by the plurality of hydraulic pressure sensors 34. An electrical output from each hydraulic pressure sensor 34 is connected to the cab bridge controller 20. The electrical bulkhead 18 includes a signal socket 42 and a power socket 44. A signal cable 46 includes a bulkhead plug 48 extending from one end and a controller plug 50 extending from an opposing end. The bulkhead plug 48 is plugged into the signal socket 42 and the controller plug 50 is plugged into the cab bridge controller 20 for transfer of electrical signals from the cab member 10 to the cab bridge controller 20. A vehicle controller 45 is preferably used to receive electrical signals from a button panel 47. The vehicle controller 45 is also used to display information to an operator display 49. The vehicle controller 45 is also connected to the cab bridge controller 20 through electrical bulkhead 18.

An output from the cab bridge controller 20 is connected to the cab transceiver 22. The cab bridge controller 20 converts the electrical signals from the plurality of hydraulic sensors 34 and the vehicle controller 45 into a suitable form for wireless transmission. The cab transceiver 22 transmits the plurality of electrical signals from the plurality of hydraulic pressure sensors 34 and electrical signals from the signal socket 42 to a frame transceiver 52. The frame transceiver sends the electrical signals to a frame bridge controller 53, which in turn sends electrical signals, which control hydraulic proportioning valves in an electrical to hydraulic valve block 55. A power cable 54 includes a generator plug 56 on one end and a power plug 58 on an opposing end. The generator plug 58 is plugged into an electrical generator 106 and the power plug 56 is plugged into the power socket 44. With the hydraulic pump 100 and the electric generator 106 connections, the modular hydraulic cab 1 is capable of operating remotely with a modular hydraulic frame 2 through wireless communication.

The docking station 12 may be used to provide a physical foundation and an operational base for the modular hydraulic cab 1. The docking station 12 includes a base member 60, the hydraulic pump 100 and the electrical generator 106. The base member 60 includes a support base 62 and at least two upright mounting members 64. The at least two upright mounting members 64 extend upward from the support base 62. At least one threaded tap or hole is formed through a top of each upright mounting member 64 to receive a retention bolt inserted through a floor 15 of the cab enclosure 14. The hydraulic sensor plate 16, cab bridge controller 20 and the cab transceiver 22 are preferably retained on the support base 62. The hydraulic pump 100 and the electrical generator 106 are attached to a top surface of the support base 62. With reference to FIG. 6, the hydraulic pump 100 is connected to the hydraulic pressure line 102 and the hydraulic return line 104. The electrical generator 106 is connected to the electrical bulkhead 18 through the power cable 46. The docking station 12 enables the hydraulic modular cab 1 to remotely operate from and wireless with the modular hydraulic frame 2.

However, modular hydraulic cab 1 does not have to be used with the docking station 12. The hydraulic pump 100 and the electrical generator 106 may be connected to the modular hydraulic cab 1 from any other suitable source, besides the docking station 12. The hydraulic sensor plate 16, the cab bridge controller 20 and the cab transceiver 22 would be physically retained on the modular hydraulic cab 1 and not on the docking device 12.

A diagnostic device 66 may be connected to the cab bridge controller 20 through a wired connection to monitor hydraulic pressures of the joysticks 24 and foot treadles 26, and status of the buttons of the button panel 47. A diagnostic device 68 may be connected to the cab bridge controller 20 through a wireless connection.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A remote wireless hydraulic cab for communication with a remote wireless frame module having at least one tool, comprising:

an electric converter valve includes a plurality of hydraulic proportioning valves, each one of said plurality of hydraulic proportioning valves are controlled by an electrical signal input;

a cab member includes a cab enclosure and at least one hydraulic joystick, said at least one hydraulic joystick includes a plurality of hydraulic lines, wherein said at least one joystick is supplied with hydraulic fluid from a hydraulic pump; and a plurality of hydraulic sensors terminate an end of said plurality of hydraulic lines, said plurality of hydraulic sensors measure hydraulic pressure from said plurality of hydraulic lines, said plurality of hydraulic sensors output a plurality of electrical signals which represent pressures of said hydraulic lines, said plurality of electrical signals are converted into a suitable form and wirelessly transmitted to the remote wireless frame module, said plurality of electrical signals are input by said plurality of hydraulic proportioning valves to control a movement of the at least one tool, said cab member is not attached to the remote wireless frame module, said cab member is at a different physical location than the remote wireless frame module.

2. The remote wireless hydraulic cab of claim 1, further comprising:
a cab bridge controller converts said electrical signals into said suitable form.

3. The remote wireless hydraulic cab of claim 2, further comprising:
a cab transceiver for wirelessly transmitting said electrical signals from said cab bridge controller to a frame transceiver of the remote wireless frame module.

4. The remote wireless hydraulic cab of claim 3, further comprising:
a diagnostic device for measuring hydraulic pressure of said at least one hydraulic joystick through said cab bridge controller or said cab transceiver.

5. The remote wireless hydraulic cab of claim 1, further comprising:
a docking station includes a support base, at least two mounting members and said hydraulic pump, said at least two mounting members extend upward from said support base, said cab member is attached to said at least two mounting members, said hydraulic pump supplies said at least one joystick with hydraulic fluid, said docking station does not include the at least one tool.

6. A remote wireless hydraulic cab for communication with a remote wireless frame module having at least one tool, comprising:
an electric converter valve includes a plurality of hydraulic proportioning valves, each one of said plurality of hydraulic proportioning valves are controlled by an electrical signal input;
a cab member includes a cab enclosure and at least one hydraulic joystick and at least one foot treadle, said at least one joystick and foot treadle include a plurality of hydraulic lines, wherein said at least one joystick and foot treadle are supplied with hydraulic fluid from a hydraulic pump; and
a plurality of hydraulic sensors terminate an end of said plurality of hydraulic lines, said plurality of hydraulic sensors measure hydraulic pressure from said plurality of hydraulic lines, said plurality of hydraulic sensors output a plurality of electrical signals which represent pressures of said hydraulic lines, said electrical signals are converted into a suitable form and wirelessly transmitted to the remote wireless frame module, said plurality of electrical signals are input by said plurality of hydraulic proportioning valves to control a movement of the at least one tool, said cab member is not attached to the remote wireless frame module, said cab member is at a different physical location than the remote wireless frame module.

7. The remote wireless hydraulic cab of claim 6, further comprising:
a cab bridge controller converts said electrical signals into said suitable form.

8. The remote wireless hydraulic cab of claim 7, further comprising:
a cab transceiver for wirelessly transmitting said electrical signals from said cab bridge controller to a frame transceiver of the remote wireless frame module.

9. The remote wireless hydraulic cab of claim 8, further comprising:
a diagnostic device for measuring hydraulic pressure of said at least one hydraulic joystick and said at least one foot treadle through said cab bridge controller or said cab transceiver.

10. The remote wireless hydraulic cab of claim 6, further comprising:
a docking station includes a support base, at least two mounting members and said hydraulic pump, said at least two mounting members extend upward from said support base, said cab member is attached to said at least two mounting members, said hydraulic pump supplies said at least one joystick with hydraulic fluid, said docking station does not include the at least one tool.

11. A remote wireless hydraulic cab for communication with a remote wireless frame module having at least one tool, comprising:
an electric converter valve includes a plurality of hydraulic proportioning valves, each one of said plurality of hydraulic proportioning valves are controlled by an electrical signal input, said electric converter valve is located on the remote wireless frame module;
a cab member includes a cab enclosure and at least one hydraulic joystick and at least one electrically operated device, said at least one hydraulic joystick includes a plurality of hydraulic lines, wherein said at least one joystick is supplied with hydraulic fluid from a hydraulic pump, said electrically operated device is powered through an electrical bulkhead, said electrically operated devices output device electrical signals; and
a plurality of hydraulic sensors terminate an end of said plurality of hydraulic lines, said plurality of hydraulic sensors measure hydraulic pressure from said plurality of hydraulic lines, said plurality of hydraulic sensors output a plurality of electrical signals which represent pressures of said hydraulic lines, said electrical signals and said device electrical signals are converted into a suitable form and wirelessly transmitted to the remote wireless frame module, said plurality of electrical signals are input by said plurality of hydraulic proportioning valves to control a movement of the at least one tool, said cab member is not attached to the remote wireless frame module, said cab member is at a different physical location than the remote wireless frame module.

12. The remote wireless hydraulic cab of claim 11, further comprising:
a cab bridge controller converts said electrical signals and said device electrical signals into said suitable form.

13. The remote wireless hydraulic cab of claim 12, further comprising:
a cab transceiver for wirelessly transmitting said electrical signals and said device electrical signals from said cab bridge controller to a frame transceiver of the remote wireless frame module.

14. The remote wireless hydraulic cab of claim 13, further comprising:
a diagnostic device for measuring hydraulic pressure of said at least one hydraulic joystick and status of said at least one electrically operated device through said cab bridge controller or said cab transceiver.

15. The remote wireless hydraulic cab of claim 11, further comprising:
a docking station includes a support base, at least two mounting members said hydraulic pump and an electrical generator, said at least two mounting members extend upward from said support base, said cab member is attached to said at least two mounting members, said hydraulic pump supplies said at least one joystick with hydraulic fluid, said at least one electrically operated device is powered by said electrical generator, said docking station does not include the at least one tool.

16. The remote wireless hydraulic cab of claim 11 wherein:
said electrical bulkhead is located in a wall or floor of said cab enclosure.

17. The remote wireless hydraulic cab of claim 11 wherein:
said at least one electrically operated device is a button panel.

* * * * *